United States Patent
Schreiber et al.

(10) Patent No.: US 11,595,243 B1
(45) Date of Patent: Feb. 28, 2023

(54) AUTOMATED INCIDENT TRIAGE AND DIAGNOSIS

(71) Applicant: Amazon Technologies, Inc., Seattle, WA (US)

(72) Inventors: Yevgeny Schreiber, Baulkham Hills (AU); Hari Krishna Prasad, Schofields (AU); Jun Yin, Ryde (AU); Alexey Tarasov, Wentworth Falls (AU); Arthur Deygin, Sydney (AU); Rafael Carvalhaes Possas, Gymea (AU); Oren Nachman, St. Ives (AU); Eshaani Gandhi, Rhodes (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/408,834

(22) Filed: Aug. 23, 2021

(51) Int. Cl.
*H04L 41/0631* (2022.01)
*H04L 41/14* (2022.01)
*H04L 41/0654* (2022.01)
*H04L 41/0816* (2022.01)
*H04L 41/16* (2022.01)

(52) U.S. Cl.
CPC ...... *H04L 41/0631* (2013.01); *H04L 41/0672* (2013.01); *H04L 41/0816* (2013.01); *H04L 41/14* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 11,271,796 B2* | 3/2022 | Tapia | G06N 20/00 |
| 2017/0353991 A1* | 12/2017 | Tapia | H04L 41/0631 |
| 2019/0306023 A1* | 10/2019 | Vasseur | H04L 43/50 |
| 2020/0057558 A1* | 2/2020 | Beloussov | G06F 3/0634 |
| 2020/0057953 A1* | 2/2020 | Livny | H04L 41/0654 |
| 2020/0293946 A1* | 9/2020 | Sachan | G06N 5/04 |
| 2020/0366547 A1* | 11/2020 | Yamashita | H04L 41/0631 |
| 2021/0035026 A1* | 2/2021 | Bansal | H04L 41/064 |
| 2021/0075689 A1* | 3/2021 | Ramanathan | G06N 3/08 |
| 2021/0224676 A1* | 7/2021 | Arzani | G06Q 10/063112 |
| 2021/0273844 A1* | 9/2021 | Xie | H04L 41/12 |
| 2021/0306201 A1* | 9/2021 | Wang | G06N 7/005 |
| 2021/0397497 A1* | 12/2021 | Tiwari | G06N 20/00 |
| 2022/0012626 A1* | 1/2022 | Ben-Itzhak | G06K 9/6215 |

OTHER PUBLICATIONS

Author: Maria Gomez et al. Title: "Mining Test Repositories for Automatic Detection of UI Performance Regressions in Android Apps" Date: May 2016 Publisher: IEEE/ACM (Year: 2016).*
Author: Phuong Pham et al. Title: "DeepTriage: Automated Transfer Assistance for Incidents in Cloud Services" Date: Aug. 2020 Publisher: ACM (Year: 2020).*

* cited by examiner

*Primary Examiner* — John A Follansbee
*Assistant Examiner* — Kamal M Hossain
(74) *Attorney, Agent, or Firm* — Nicholson De Vos Webster & Elliott LLP

(57) ABSTRACT

Techniques for automated incident triage and diagnosis are described. A method of automated incident triage and diagnosis may include receiving incident data associated with an incident, identifying one or more mitigation actions to resolve the incident using at least one machine learning model based at least on the incident data, and automatically executing the one or more mitigation actions to mitigate the incident.

20 Claims, 10 Drawing Sheets

AUTOMATED INCIDENT TRIAGE AND DIAGNOSIS

BACKGROUND

An incident occurs when a product or a system fails, impacting its customers, and causing losses and damages both to the product business and the customers. For example, if a service stops responding in a provider network, then the service or a closely related service or system is experiencing an incident. Correctly triaging and diagnosing such incidents as quickly as possible is necessary to mitigate the impact on the provider network, its services, and its customers, and bring the affected product or system state back to normal operation. Such incident investigation in real time is usually complicated, as it involves many possible factors and possible causes, and therefore mostly depends on personal knowledge of the incident participants who attempt to resolve it manually. This can lead to services being unavailable for an extended period of time while the incident is investigated, diagnosed, and mitigated.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for automated incident triage and diagnosis. According to some embodiments, an incident management service is responsible for automatically identifying possible causes of an incident, and the teams most likely able to assist in mitigating the incident, when an incident is detected. For example, the incident management service can scan a large stream of provider network state changes (e.g., code deployments, etc.) in real time, and can match the current incident description (e.g., including impacted regions, services, metrics, etc.) to a likely cause using a Machine Learning (ML) model based on historical incidents and changes. The resulting assessment may include which products or services are most relevant to focus on, which additional teams are required, and which metrics and recent changes need resolvers' attention. This assessment is integrated with other incident orchestration tools to automate corresponding actions, including auto-engaging additional relevant teams. While not fully replacing the human expertise, the incident management service helps focus and automate part of the diagnosis process, which reduces the amount of time required to identify relevant mitigation strategies and return the service(s) to operation sooner. Additionally, embodiments allow incidents to be analyzed using machine learning while the incidents are occurring. As such, rather than being applied retrospectively after incidents have already occurred and been mitigated, embodiments improve the mitigation response itself to an ongoing incident.

Figure 1:
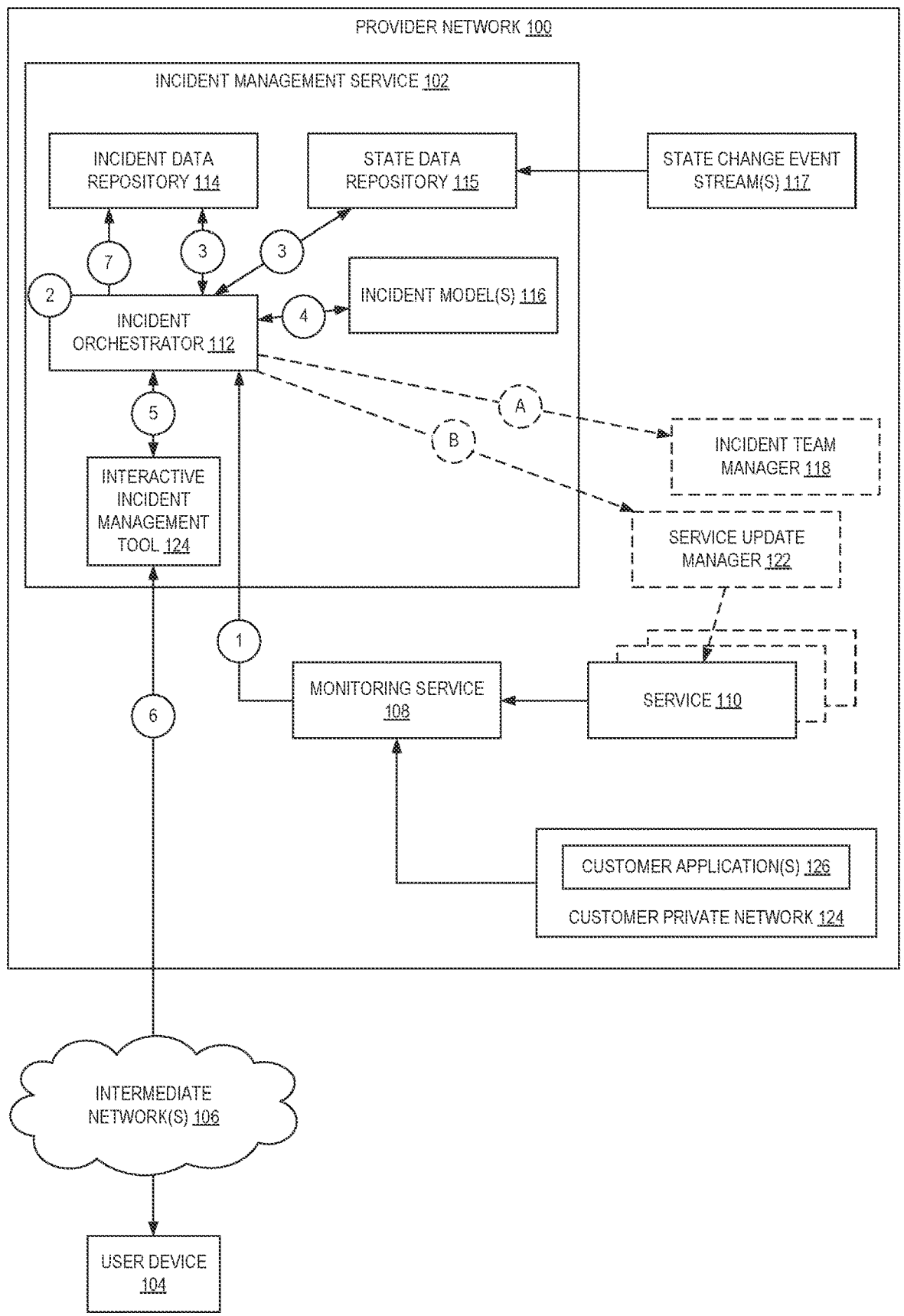
FIG. 1 is a diagram illustrating an environment for automated incident triage and diagnosis according to some embodiments.

FIG. 1 is a diagram illustrating an environment for automated incident triage and diagnosis according to some embodiments. As shown in FIG. 1, a provider network 100 may include a plurality of services 110. These may include services that enable customers of the provider network to create their own applications and services, such as storage services, hardware virtualization services, container services, etc. If an incident occurs that affects one or more of these provider network services, then the applications and services of a large number of customers are potentially affected. This may lead to service outages that are costly for the provider network and its customers. Embodiments include an incident management service 102 which is responsible for automatically diagnosing likely causes of an incident in real time. In some embodiments, the incident management service 102 may automatically execute one or more mitigation actions, such as engaging technical teams to begin mitigating the incident, rolling back changes to the provider network that may be responsible for the incident, etc. Once the incident has been resolved, the incident management service 102 can additionally collect information about the resolved incident, its causes, and how it was resolved, to improve its performance on future incidents.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106

(e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

In various embodiments, a "serverless" function can include code provided by a user or other entity—such as the provider network itself—that can be executed on demand Serverless functions can be maintained within a provider network by an on-demand code execution service (referred to in various embodiments as a function compute service, functions service, cloud functions service, functions as a service, or serverless computing service), and can be associated with a particular user or account, or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain the underlying hardware resources used to execute the serverless function. Instead, the serverless functions can be executed on demand using resources maintained by the provider network 100. In some embodiments, these resources can be maintained in a "ready" state (e.g., having a pre-initialized runtime environment configured to execute the serverless functions), allowing the serverless functions to be executed in near real-time. For example, a user can use the on-demand code execution service by uploading their code and use one or more APIs to request that the service identify, provision, and manage any resources required to run the code.

As shown in FIG. 1, the incident management service 102 can include an incident orchestrator 112, an incident data repository 114, and one or more incident models 116. The incident data repository 114 includes data related to past incidents. For example, a past incident's data may include: its start time and timeline of events; an impact description including impacted services, metrics and locations; a list of engaged groups and experts; state changes that occurred to the provider network 100 within 24 hours before the incident, including code changes and deployments, customer behavior changes, infrastructure issues, etc., with a timeline of each such event; post-incident analysis indicating the root cause of the incident and other relevant details. In some embodiments, the incident data repository is associated with a continuous data collection process that regularly (e.g., continuously or periodically) updates the incident data repository 114 with similar details for new incidents and ongoing events from various sources. The data collection can involve automatic storage of all incidents time-lines; subscription to sub-pub systems that emit additional data about incidents and pre-incident events; continuous polling of systems that store such data, but do not stream it out, etc. The incident data repository may be configured to receive data from various services including code commit services, monitoring services (such as monitoring service 108), configuration services, etc.

At numeral 1, incident orchestrator 112 can receive data from one or more monitoring services 108 which includes various performance metrics which characterize the performance of one or more services 110 of provider network 100. For example, the performance metrics (also referred to as performance data) may include CPU, memory usage, latency, response time, etc. and may also include availability, health, or other service quality indicators or aggregations of any or all of these metrics. In some embodiments, the monitoring service provides data which allow a user to monitor their applications, respond to system-wide performance changes, optimize resource utilization, and get a unified view of operational health. The data may include monitoring and operational data in the form of logs, metrics, and events, providing performance data for computing resources, applications, and services that run on provider network-managed resources. The monitoring service 108 may additionally, or alternatively, include a configuration service that assesses, audits, and evaluates the configurations of computing resources in provider network 100.

At the beginning of an incident, the metrics of one or more services may begin to degrade. Based on these metrics (e.g., a specific metric value, a metric value relative to a minimum threshold or maximum threshold, depending on the metric, etc.), at numeral 2, the incident orchestrator 112 may determine that an incident is occurring. At numeral 3, while the incident is occurring, the incident orchestrator 112 can retrieve past incident data from incident data repository 114 and state change information from a prior time period that is maintained in state data repository 115. This state information may include possible internal changes to impacted services that may have triggered the incident (such as a specific code deployment, a configuration change, etc.). In some embodiments, the state information may include all state changes from the prior time period (e.g., past 12 hours, 24 hours, or other configurable amount of time). In some embodiments, the state data may also include customer behavior changes, infrastructure issues, etc., with a timeline of each such event. In some embodiments, the past incident data may include, for each past incident, its start time and timeline of events; impact description including impacted services, metrics and locations; list of engaged groups and experts; and post-incident analysis indicating the root cause of the incident and most relevant details. As shown in FIG. 1, state data repository 115 may obtain state change data from one or more state change event streams 117. For example, the state data repository 115 may subscribe to the state change event streams. In some embodiments, various services may publish state change event streams to which the state data repository may subscribe. In some embodiments, the state change data may be provided by monitoring service 108 or other service.

At numeral 4, the current incident information (e.g., metrics determined to be associated with an incident at numeral 2) and the prior state information is provided to one or more incident models 116. In various embodiments, incident models 116 may include machine learning models, such as deep learning models, tree models, statistical models, etc., which have been trained to identify likely causes of an incident based on current and past performance data from the provider network 100. In some embodiments, incident model 116 is hosted as part of a model hosting system of a machine learning service, as discussed further below. Alternatively, the incident model may be implemented as part of incident management service 102, as shown in FIG. 1.

The incident model 116 may be trained on the prior incident data that has been labeled with its resolution information. This enables the incident model 116 to learn to associate specific inputs (e.g., a description of the incident, metric data associated with affected services, etc.) with the mitigation actions and/or teams that were deployed to resolve the past incidents. When data associated with a current incident is received, the incident model 116 can then infer the likely root cause of the incident and its most relevant details given the incidents data known at the start of the incidents and within its first minutes (e.g., impact description and metrics, and the list of events in the recent 24 hours). In some embodiments, the incident model 116 can use both Natural Language Processing (NLP) and tabular data in the given inputs to learn and infer which of the recent events and which of the potentially relevant resources and areas are most relevant to the current incident. In some embodiments, the incident data is translated into specific features for the incident model. For example, an NLP model may be used to process descriptions of the incident into features and then those features are provided to the incident model. This enables, for example, the incident model to learn to identify incidents that are described using similar terms. Similarly, the tabular data may be processed into features, using a model or otherwise transforming the tabular data into feature vectors, prior to providing the data to the incident model.

In some embodiments, the incident model 116 outputs a probability of one or more services being associated with the root cause of the incident and a probability of a particular incident team as being relevant to resolving the incident. Optionally, depending on the probability, the incident orchestrator may automatically take one or more mitigation actions. For example, at A, the incident orchestrator may automatically engage a specific incident response team. This may include sending a request to incident team manager 118 which notifies members of the incident response team. In some embodiments, additional investigation tasks may be assigned to the engaged experts. Additionally, or alternatively, the incident orchestrator 112 may automatically update, roll back, or otherwise change the deployment of a service identified as being likely to be a cause of the incident. For example, at B, the incident orchestrator 112 may send a request to a service update manager 122 to update or roll back a specific service 110 to resolve the incident.

In some embodiments, at numeral 5, the incident orchestrator can provide an Interactive Incident Management tool 124, which provides a user interface to communicate with one or more incident participants. As shown in FIG. 1, the incident participants may access the interactive incident management tool 124 via a user device external to provider network 100. Alternatively, or additionally, the participant may access the interactive incident management tool 124 from within the provider network. The incident orchestrator 112 can provide information to the participant indicating the inferred diagnosis from the incident model 116 via the user interface of the interactive incident management tool 124. In some embodiments, the participants accessing the interactive incident management tool 124 may be experts engaged via incident team manager 118. Alternatively, the participants may include employees of a customer or other investigators. At numeral 6, the participants can view the inferred diagnosis, and interact with the tool 124 to request additional information in specific areas. In some embodiments, the participants can also manually update some or all of the ongoing diagnosis, based on their further investigation, and immediately share the updated findings with other participants via the incident management tool 124 or other communication channel.

Once the incident has been resolved, the participants may provide additional feedback via interactive incident management tool 124. For example, the participants may identify the actual root cause that led to the incident. Additionally, or alternatively, the specific mitigation actions, the team responsible for identifying and implementing the actions, state changes that occurred and which state changes were relevant to the incident, etc. may also be provided. This serves as the ground truth incident label for this incident. This data is then added to incident data repository 114, at numeral 7. In some embodiments, when incident data repository 114 is updated with new incident information, a new training task is triggered which retrains incident model(s) 116. For example, a model training system of a machine learning service of the provider network may be invoked to start a new training task. The incident data maintained in incident data repository 114 is then provided to train a new incident model (or retrain the existing model). Once trained, the incident model is then deployed (e.g., via a model hosting service) where it can be used for future incident diagnosis.

The above-described examples relate to incident diagnosis and mitigation for incidents that are caused by services or components of provider network 100. In addition, or alternatively, embodiments may assist in diagnosis and mitigation of incidents caused due to a customer's application. A customer may host their own applications in provider network 100 which are then used by other external users, the customer's other applications, or other users. For example, the customer may have a private network 124 which may include instances used to host their application(s) 126. The customer applications can provide performance data (e.g., metrics, service quality indicators, etc.) to monitoring service 108. Additionally, in some embodiments, state change data associated with customer applications 126 can be published by the customer and obtained by state data repository 115. Processing of customer incidents may proceed generally as discussed above. For example, monitoring service 108 detects an incident associated with monitoring data received from customer application 126. The incident orchestrator then obtains past incident data and state change data from incident data repository 114 and state data repository 115. In some embodiments, separate incident data and/or state data repositories may be maintained for each customer. The past incident data, current incident data, and state change data is then provided to incident models 116. In particular, incident models 116 may include a customer-specific model which has been trained on past customer incident data to determine the likely causes of a customer's incident. Based on the results from the customer incident model, the appropriate teams and/or state change rollbacks may be automatically engaged. In some embodiments, the customer may have their own service update manager which may be instructed by incident orchestrator 112 to roll back a recent change or changes. Additionally, the customer may have their own incident teams that can be engaged to diagnose and mitigate the incident in the customer application based on the results provided by incident management service. In the examples described herein, the incident management service 102 may manage incidents in provider network 100 and/or in a customer application.

Figure 2:
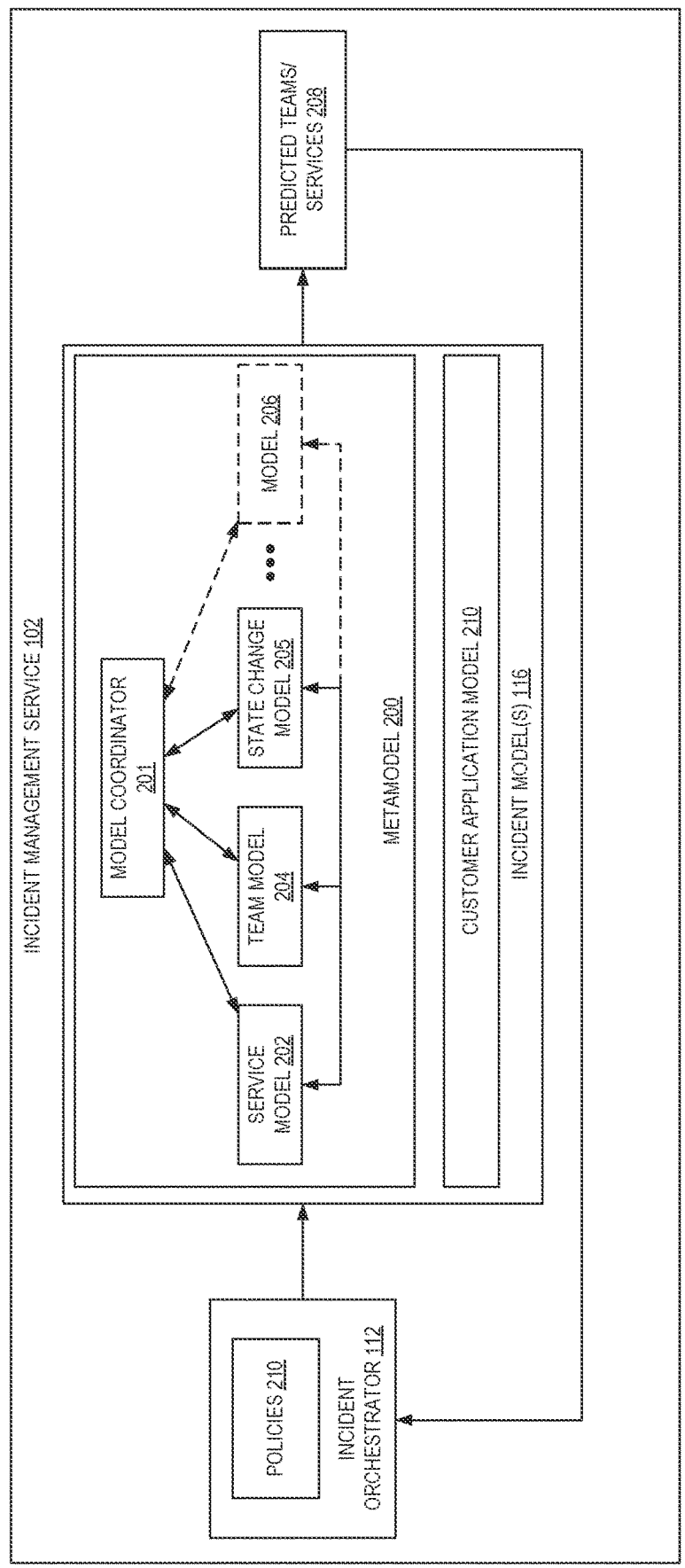
FIG. 2 is a diagram illustrating an example meta model for automated incident triage and diagnosis according to some embodiments.

FIG. 2 is a diagram illustrating an example meta model for automated incident triage and diagnosis according to some embodiments. As shown in FIG. 2, in some embodiments, incident orchestrator 112 invokes incident model(s) 116. In some embodiments, incident models 116 includes an ensemble of models. For example, the incident models 116 may include a metamodel 200 which includes a model coordinator 201 which coordinates the execution of one or more additional models 202-206. By using an ensemble of models, a more accurate result may be obtained than any one model on its own. For example, the results of one model may be provided to another model (along with some or all of the input data provided to the first model) to obtain an inference result. In some embodiments, the results of multiple models may be combined by metamodel 200 to produce the predicted results 208. In some embodiments, metamodel 200 may determine an order in which models 202-206 are to process the input data, together with results of the previously executed models.

As shown in FIG. 2, the models may include a service model 202 and a team model 204 and may optionally include additional models, depending on implementation needs. In some embodiments, the service model 202 can be invoked to identify the products, services, or systems of the provider network or of the customer's infrastructure (e.g., applications, instances, etc.) most likely to be responsible for the incident. The service model can receive the metrics and state data obtained by the incident orchestrator 112, as described above, and can output values for various products, services, or systems which indicate how likely that particular product, service, or system is responsible for the current incident. The service results can be used as input to team model 204 or otherwise combined with the results of team model 204. In some embodiments, metamodel 200 may also include state change model 205. State change model 205 can receive the state data obtained from incident orchestrator 112 and output values for various state changes that have occurred within the most recent window of time since the incident was detected. The values output by state change model 205 may indicate a likelihood that a given state change is associated with (e.g., a likely cause of) the current incident. In some embodiments, the results of each model are provided to the model coordinator 201 which uses the results of the models 202-206 to output the predicted teams/services 208. As discussed, the predicted teams/services 208 may include a plurality of teams and a plurality of services, each with a corresponding score indicating the likelihood that that team or service is relevant to the current incident.

These results can then be returned to the incident orchestrator which can then determine a mitigation action to be performed based on the prediction results. For example, the incident orchestrator can automatically engage a particular incident team. The incident team may include one or more experts associated with the affected service(s) who can identify one or more actions to be performed to mitigate the incident. The mitigation actions may also include automatically applying a software update or rolling back a recent software update, deployment, or other code change. In some embodiments, the incident orchestrator may include one or more policies 210 that determine which mitigation actions to be performed based on the predicted likelihood from the machine learning models 116. For example, policies 210 may define one or more thresholds for how likely a service/team is to be involved in order to be automatically engaged. Similarly, services/teams below a threshold defined in policies 210 may be filtered out of results before being presented to a participant via interactive incident management tool. This way, a user can tune their response based on how aggressive of a response they want to an incident. For example, all teams with a predicted probability greater than a threshold may be defined by a policy to be automatically engaged for a more aggressive approach, while a less aggressive approach may define a policy in which only the team with the highest predicted probability may be engaged. Likewise, a policy may require human approval before any mitigation action (e.g., team engagement, code roll back, etc.) may be performed.

As discussed, in some embodiments, incident model 116 may also include a customer application model 210. In some embodiments, the customer application model 210 may include a metamodel similar to metamodel 200, as discussed above. However, the customer application model 210 may be trained on past incident data associated with one or more customer applications, the customer's past incident response, etc. State change data, performance data, etc. associated with the customer's application(s) may be provided to the customer application model 210 by the incident orchestrator when an incident is detected to determine whether the cause of the incident is associated with the customer's application instead of, or in addition to, one or more services or components of the provider network. Processing of the incident data by the customer application model 210 may proceed similarly to that described above with respect with metamodel 200.

Figure 3:
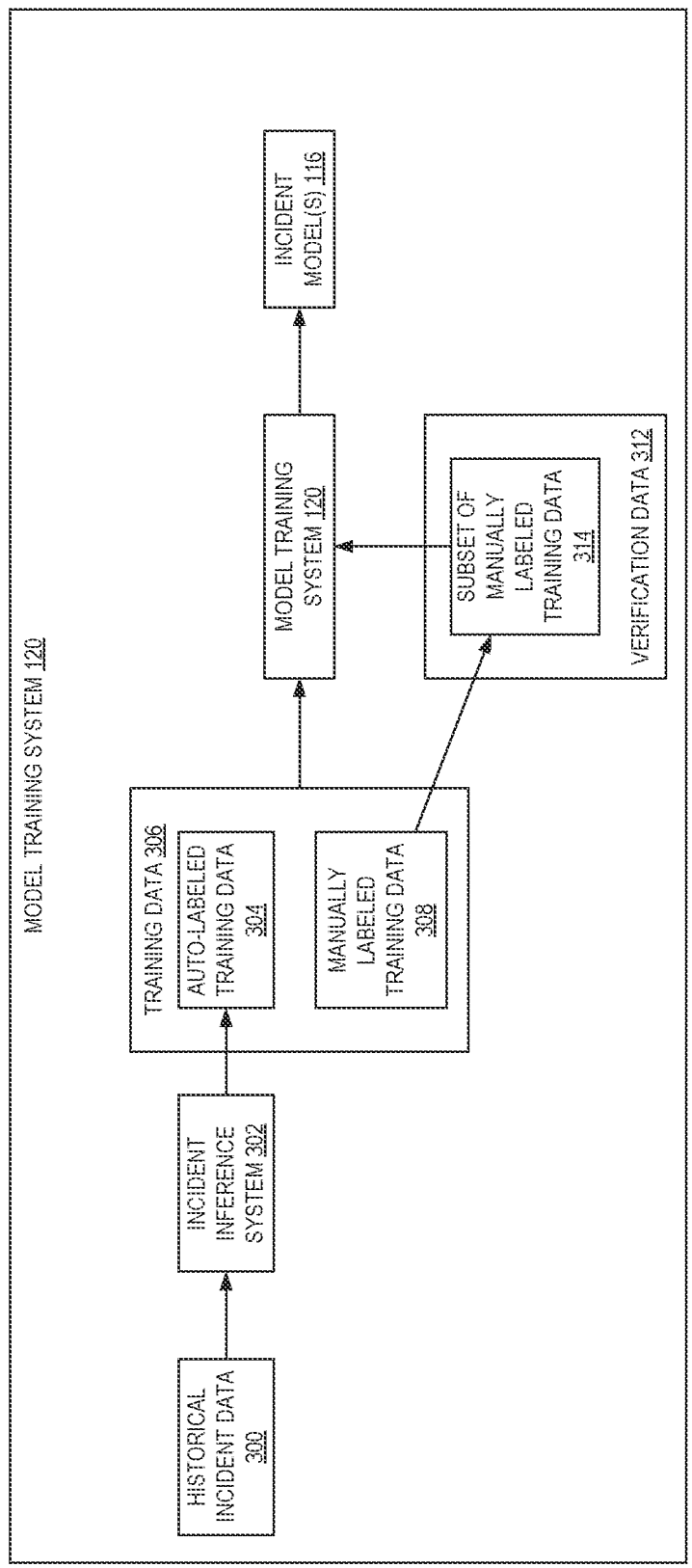
FIG. 3 is a diagram illustrating a model training system that uses auto-labeling to train one or more models for automated incident triage and diagnosis according to some embodiments.

FIG. 3 is a diagram illustrating a model training system that uses auto-labeling to train one or more models for automated incident triage and diagnosis according to some embodiments. A machine learning model can be made more accurate by using a larger and more diverse training dataset. However, obtaining a training dataset that is accurately labeled can be costly and difficult. For example, manually labeling historical incident data 300 can be very time consuming and may require labelers with technical expertise to confirm the actual root cause of a given historical incident (particularly when the data may not be a complete record of the incident). Accordingly, embodiments can auto-label historical incident data 300 to create a larger training dataset.

As shown in FIG. 3, the historical incident data 300 can be provided to incident inference system 302. In some embodiments, incident inference system 302 may include a machine learning model trained, e.g., using a smaller, manually labeled training dataset. This machine learning model may be the same or similar to the machine learning models described above. In some embodiments, the incident inference system 302 can receive historical incident data 300 associated with one historical incident. Similar to the examples discussed above, the historical incident data may include performance metrics from when the incident was detected and state information from a period of time prior to the incident being detected. The incident inference system can then infer a likely cause of the incident (a code change, etc.) and label that historical incident with the inferred cause. In some embodiments, if multiple causes have a highest probability (or are within a threshold difference of one another) then the historical incident may be labeled with the multiple causes. This results in auto-labeled training data 304, which is part of training data 306 along with manually labeled training data 308.

A model training system 120 may then be used to train the incident model(s) 116. 120 A machine learning model, generally, may be thought of as one or more equations that are "trained" using a set of data. In some embodiments, the model training system 120 provides ML functionalities as a web service, as discussed further below. As the model is trained, the performance of the model can be checked using verification data 312. In some embodiments, verification data 312 may include a subset of the manually labeled training data 314 that was not used for training the model. When the model performs up to a pre-determined standard on the verification data, the model is considered trained and is output by the model training system 120. In some embodiments, the resulting trained incident model(s) 116 are then provided to a model hosting system where it can receive inference requests from the incident orchestrator 112. Alternatively, the model may be returned to the incident management service 102 which may host the model itself for performing inference on incident data as incidents are detected.

Figure 4:
FIG. 4 is a diagram illustrating an example user interface for automated incident triage and diagnosis according to some embodiments.

FIG. 4 is a diagram illustrating an example user interface for automated incident triage and diagnosis according to some embodiments. As shown in FIG. 4, an incident management service user interface 400 can be presented to a user (e.g., incident participant, expert, etc.) in order to display the likely diagnosis, proposed mitigation actions to the user. For example, the UI 400 may indicate the product 402, the service/component 404, the reason 406, and the confidence 408. In some embodiments, the product 402 may include the name of the product or provider network service impacted by the incident. Each product or service may include various other services or components 404 which may specifically be impacted. For example, a particular API within a service, the service's control plane or data plane, etc.

Additionally, a description of the reason why the product or component has been flagged can also be provided. For example, in FIG. 4, product A and its service/component 1 have been flagged with high confidence 408 because the are impacted by the incident and are associated with recent changes. Service/component 2 is flagged for being helpful in past similar incidents. In some embodiments, the reason 406 is provided based on the results of the incident model(s). In some embodiments, one incident model may be trained to identify the reasons for a given product/component/etc. based on the results of other incident models. In some embodiments, the confidence 408 may be provided descriptively, as shown in FIG. 4 (e.g., high, medium, low). In such instances, the description of the confidence may correspond to ranges of likelihood. For example, confidence may be computed based on how frequently similar recommendations were correct in the past (e.g., low is ⅙ or worse, medium is ½ or ⅓, high is greater than ½).

The UI 400 may additionally provide one or more actions 410 for the user to select. For example, the user can select a user interface element associated with a particular product/component, such as selection box 412. The user can then select and action to be performed on the selected item, such as engage team, mark as relevant, mark as irrelevant, get more details, etc.

Figure 5:
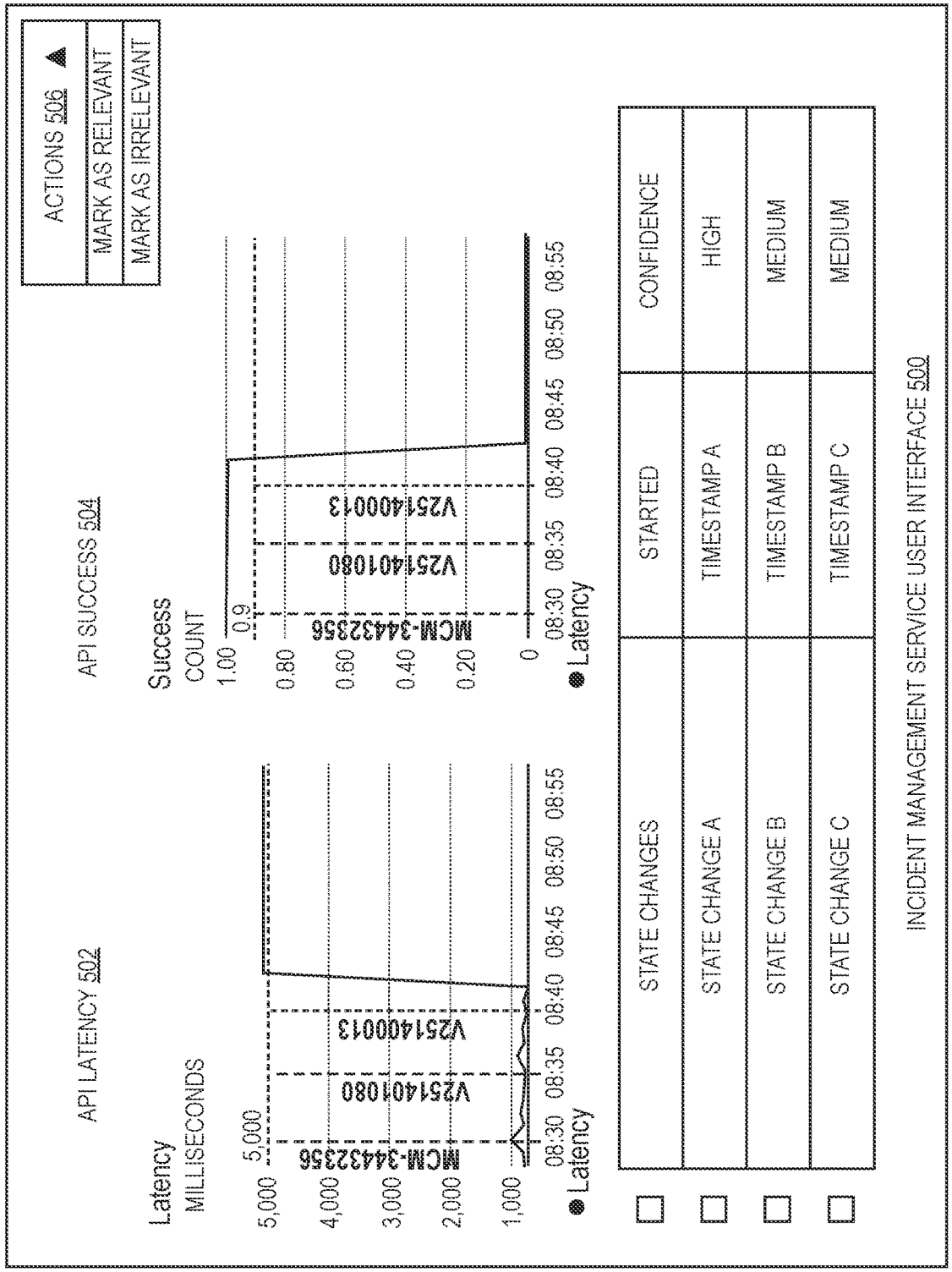
FIG. 5 is a diagram illustrating an example user interface for automated incident triage and diagnosis according to some embodiments.

FIG. 5 is a diagram illustrating an example user interface for automated incident triage and diagnosis according to some embodiments. In the example, of FIG. 4, the user may select a particular item in UI 400 and request additional information. For example, if the user selects service/component 1 of product A and requests additional information, they may be shown incident management service UI 500. This may include performance charts, such as API latency 502 and API success 504. Additionally, the UI 500 may identify specific state changes and associated timestamp information and confidence corresponding to the product or service/component being viewed. This allows the user to focus their mitigation efforts on specific components and state changes that are most likely to be associated with the incident first. The user can select the components and mark them as relevant or not relevant via actions element 506.

Figure 6:
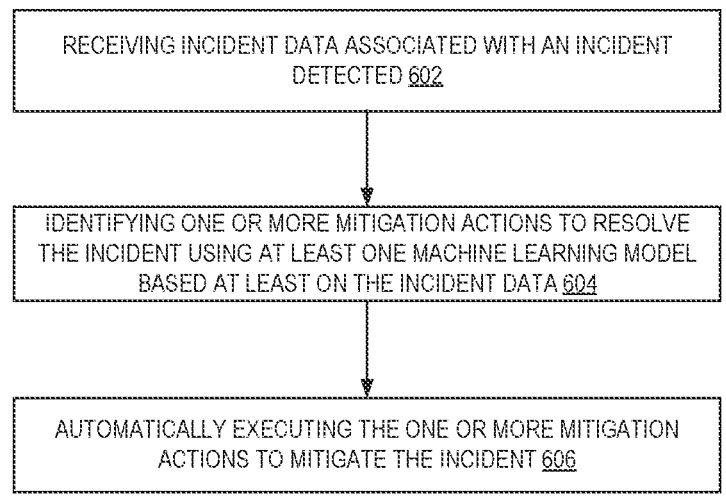
FIG. 6 is a flow diagram illustrating operations of a method for automated incident triage and diagnosis according to some embodiments.

FIG. 6 is a flow diagram illustrating operations 600 of a method for automated incident triage and diagnosis according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by incident management service 102, model training system 120, etc. of the other figures.

The operations 600 include, at block 602, receiving incident data associated with an incident. In some embodiments, the incident is associated with a service or component of a provider network. Alternatively, in some embodiments, the incident is associated with a service or component of a customer application running in a provider network. In some embodiments, the incident comprises a change in service quality of a service or component. In some embodiments, the incident data is received from a monitoring service of the provider network which requests an incident management service to analyze the incident.

The operations 600 further include, at block 604, identifying one or more mitigation actions to resolve the incident using at least one machine learning model based at least on the incident data. In some embodiments, the at least one machine learning model comprises an ensemble of machine learning models including a first machine learning model to identify a team associated with the incident and a second machine learning model to identify a provider network component associated with the incident.

The operations 600 further include, at block 606, automatically executing the one or more mitigation actions to mitigate the incident. In some embodiments, the one or more mitigation actions include at least one of engagement of a team indicated by the at least one machine learning model to be associated with a cause of the incident or roll back of a state change indicated by the at least one machine learning model to be associated with the cause of the incident.

In some embodiments, the operations further include maintaining an incident data repository comprising past incident data associated with a plurality of past incidents, wherein the past incident data is received from a plurality of monitoring services of the provider network and includes state data and performance metric data associated with each past incident. In some embodiments, the operations further include providing the past incident data to a model training system of a machine learning service of the provider network, wherein the model training system is configured to train the at least one machine learning model using the past incident data. In some embodiments, at least a portion of the past incident data is auto-labeled to indicate a cause of a corresponding past incident and details of a resolution of the corresponding past incident.

In some embodiments, the operations further include receiving resolution data associated with the incident after the incident has been resolved, the resolution data indicating a team responsible for resolving the incident, a cause of the incident, and an action taken to resolve the incident, and updating the incident data repository to include the resolution data associated with the incident. In some embodiments, the operations further include providing updated past incident data including the resolution data associated with the incident to the model training system, and causing the model training system to retrain the at least one machine learning model using the updated past incident data.

In some embodiments, the operations further include providing an incident management user interface which includes a visual representation of the incident and the one or more mitigation actions, and receiving instructions to perform at least one mitigation action via the incident management user interface. In some embodiments, the operations further include receiving a request to mark at least one component as relevant or not relevant to the incident via the incident management user interface.

In some embodiments, the operations include receiving a request from a monitoring service of a provider network to identify a cause of an incident affecting performance of one or more services or components, the request including performance metric data associated with the provider network, obtaining state data from an incident data repository, the state data indicating changes to the provider network over a previous time period prior to the incident, providing the performance metric data and the state data to an incident machine learning model, the incident machine learning model trained to predict a cause of incidents affecting the provider network and to predict a team to resolve the incidents affecting the provider network, receiving inference results from the incident machine learning model indicating at least one cause of the incident and at least one team to resolve the incident, and automatically executing one or more mitigation actions to mitigate the incident based at least on the inference results.

In some embodiments, automatically executing one or more mitigation actions to mitigate the incident based at least on the inference results, further includes based on a confidence value associated with the at least one team to resolve the incident, automatically engaging the at least one team to mitigate the incident. In some embodiments, automatically executing one or more mitigation actions to mitigate the incident based at least on the inference results, further includes based on a confidence value associated with the at least one team to resolve the incident, automatically sending a request to a service update manager to roll back the state change.

Figure 7:
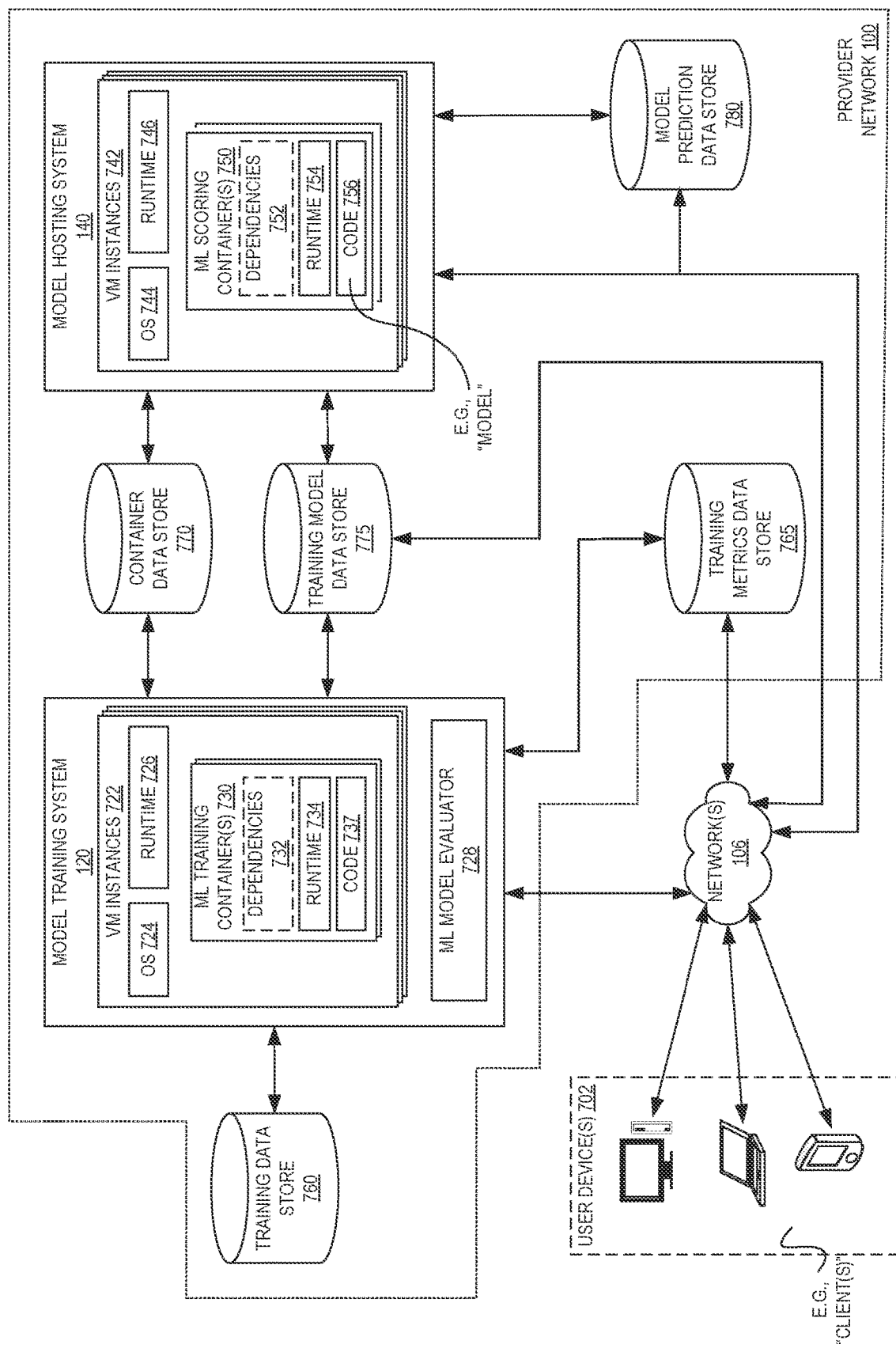
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, computing devices(s), edge device(s)), a model training system, a model hosting system, a training data store 760, a training metrics data store 765, a container data store 770, a training model data store 775, and a model prediction data store 780.

A machine learning service described herein may include one or more of these entities, such as the model hosting system 140, model training system 120, and so forth.

In some embodiments, users, by way of user devices 702, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 702 and the model training system 120 (or provider network 100), and/or between components of the model training system 120 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 120 via frontend 729 of the model training system 120. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 120 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 120 can retrieve the container image from the indicated location and create a container using the retrieved container image. The container is then loaded into a virtual machine instance 722 for training a machine learning model, as described in greater detail below.

The model training system 120 can use the information provided by the user device 702 to train a machine learning model in one or more pre-established virtual machine instances 722 in some embodiments. In particular, the model training system 120 includes a single physical computing device or multiple physical computing devices that are interconnected using one or more computing networks (not shown), where the physical computing device(s) host one or more virtual machine instances 722. The model training system 120 can handle the acquisition and configuration of compute capacity (for example, containers, instances, etc., which are described in greater detail below) based on the information describing the computing machine on which to train a machine learning model provided by the user device 702. The model training system 120 can then train machine learning models using the compute capacity, as is described in greater detail below. The model training system 120 can automatically scale up and down based on the volume of training requests received from user devices 702 via frontend 729, thereby relieving the user from the burden of having to worry about over-usation (for example, acquiring too little computing resources and suffering performance issues) or under-usation (for example, acquiring more computing resources than necessary to train the machine learning models, and thus overpaying).

In some embodiments, the virtual machine instances 722 are used to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be used to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or use) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 used by the virtual machine instance 722. In some embodiments, the runtime 734 is different than the runtime 726 used by the virtual machine instance 722.

In some embodiments, the model training system 120 uses one or more container images included in a training request (or a container image retrieved from the container data store 770 in response to a received training request) to create and initialize a ML training container 730 in a virtual machine instance 722. For example, the model training system 120 creates a ML training container 730 that includes the container image(s) and/or a top container layer.

Prior to beginning the training process, in some embodiments, the model training system 120 retrieves training data from the location indicated in the training request. For example, the location indicated in the training request can be a location in the training data store 760. Thus, the model training system 120 retrieves the training data from the indicated location in the training data store 760. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 120 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 120 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 120 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 120 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 120 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 120 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 120 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 120 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 120 can cause the virtual machine instance 722 to modify the execution of code stored in an existing ML training container 730 according to the data provided in the modification request. In some embodiments, the user, via the user device 702, can transmit a request to the model training system 120 to stop the machine learning model training process. The model training system 120 can then instruct the virtual machine instance 722 to delete the ML training container 730 and/or to delete any model data stored in the training model data store 775.

As described below, in some embodiments, the model data stored in the training model data store 775 is used by the model hosting system 140 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 140, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 742. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 702 via frontend 749 of the model hosting system 140, thereby relieving the user from the burden of having to worry about over-usation (for example, acquiring too little computing resources and suffering performance issues) or under-usation (for example, acquiring more computing resources than necessary to run the machine learning models, and thus overpaying).

In some embodiments, the virtual machine instances 742 are used to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be used to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 used by the virtual machine instance 742. In some embodiments, runtime 754 is different than the runtime 746 used by the virtual machine instance 742.

In some embodiments, the model hosting system 140 uses one or more container images included in a deployment request (or a container image retrieved from the container data store 770 in response to a received deployment request) to create and initialize a ML scoring container 750 in a virtual machine instance 742. For example, the model hosting system 140 creates a ML scoring container 750 that includes the container image(s) and/or a top container layer.

As described above, a user device 702 can submit a deployment request and/or an execution request to the model hosting system 140 via the frontend 749 in some embodiments. A deployment request causes the model hosting system 140 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 140 initializes ones or more ML scoring containers 750 in one or more hosted virtual machine instance 742. In embodiments in which the deployment request includes an identification of one or more container images, the model hosting system 140 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 140 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 140 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 140 unarchives or decompresses the model data file to obtain multiple individual files and inserts the individual files into the ML scoring container 750. In some embodiments, the model hosting system 140 stores the model data file in the same location as the location in which the model data file was stored in the ML training container 730 that generated the model data file. For example, the model data file initially was stored in the top container layer of the ML training container 730 at a certain offset, and the model hosting system 140 then stores the model data file in the top container layer of the ML scoring container 750 at the same offset.

In embodiments in which multiple model data files are identified in the deployment request, the model hosting system 140 retrieves the identified model data files from the training model data store 775. The model hosting system 140 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 750 with the endpoint identified in the deployment request. For example, each of the initialized ML scoring container(s) 750 can be associated with a network address. The model hosting system 140 can map the network address(es) to the identified endpoint, and the model hosting system 140 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 140 via the frontend 749, where the execution request identifies an endpoint and includes an input to a machine learning model (for example, a set of input data). The model hosting system 140 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 140 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 120, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 7 are not meant to be limiting. For example, the model training system 120 and/or the model hosting system 140 could also operate within a computing environment having a fewer or greater number of devices than are illustrated in FIG. 7. Thus, the depiction of the model training system 120 and/or the model hosting system 140 in FIG. 7 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 120. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 140. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 120 and the model hosting system 140, this is not meant to be limiting. For example, in some embodiments not shown, the training data store 760 is located internal to at least one of the model training system 120 or the model hosting system 140.

In some embodiments, the training metrics data store 765 stores model metrics. While the training metrics data store 765 is depicted as being located external to the model training system 120 and the model hosting system 140, this is not meant to be limiting. For example, in some embodiments not shown, the training metrics data store 765 is located internal to at least one of the model training system 120 or the model hosting system 140.

The container data store 770 stores container images, such as container images used to form ML training containers 730 and/or ML scoring containers 750, that can be retrieved by various virtual machine instances 722 and/or 742. While the container data store 770 is depicted as being located external to the model training system 120 and the model hosting system 140, this is not meant to be limiting. For example, in some embodiments not shown, the container data store 770 is located internal to at least one of the model training system 120 and the model hosting system 140.

The training model data store 775 stores model data files. In some embodiments, some of the model data files are comprised of a single file, while other model data files are packages of multiple individual files. While the training model data store 775 is depicted as being located external to the model training system 120 and the model hosting system 140, this is not meant to be limiting. For example, in some embodiments not shown, the training model data store 775 is located internal to at least one of the model training system 120 or the model hosting system 140.

The model prediction data store 780 stores outputs (for example, execution results) generated by the ML scoring containers 750 in some embodiments. While the model prediction data store 780 is depicted as being located external to the model training system 120 and the model hosting system 140, this is not meant to be limiting. For example, in some embodiments not shown, the model prediction data store 780 is located internal to at least one of the model training system 120 and the model hosting system 140.

While the model training system 120, the model hosting system 140, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. In some embodiments, the model training system 120 and/or the model hosting system 140 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
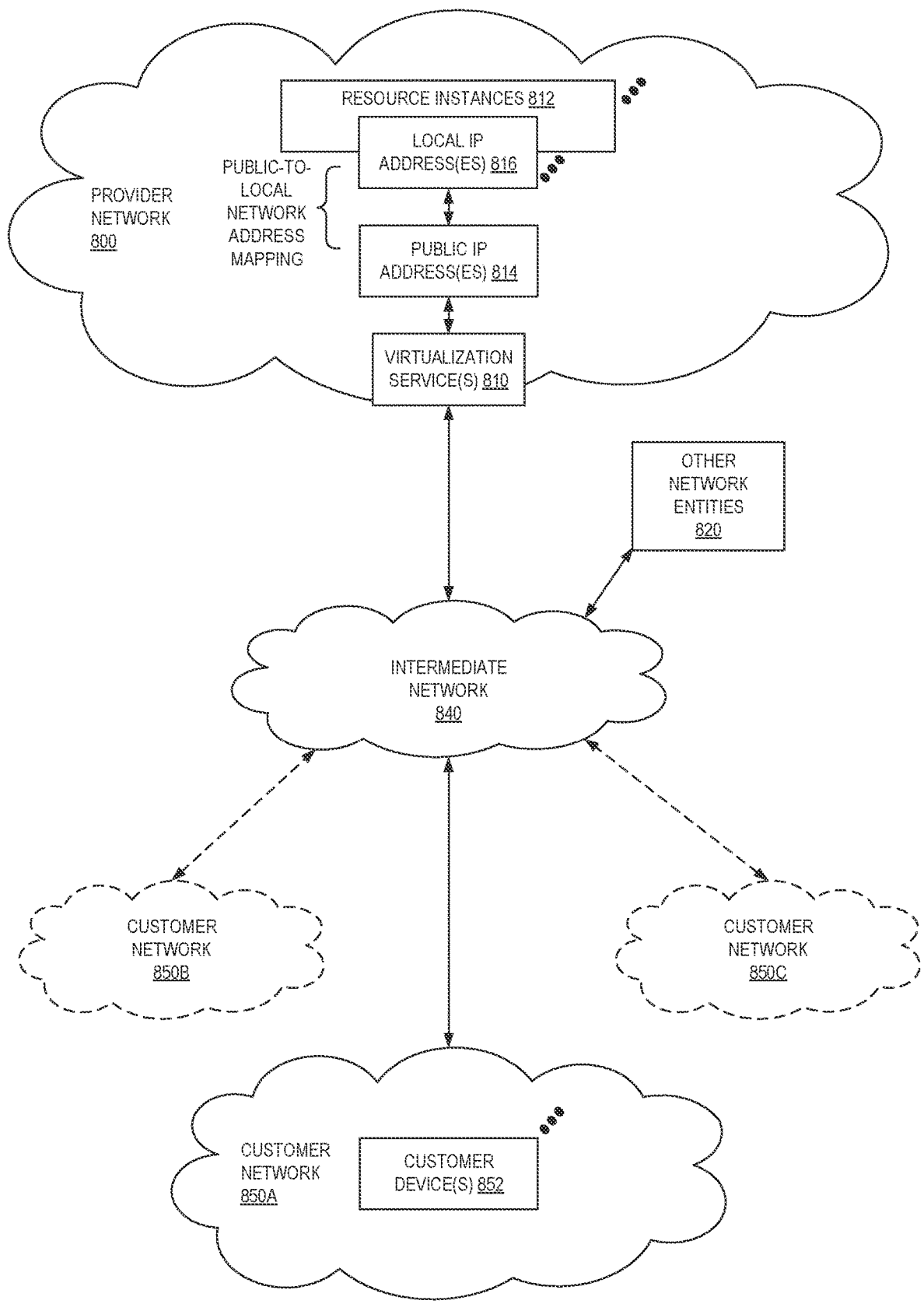
FIG. 8 illustrates an example provider network environment according to some embodiments.

FIG. 8 illustrates an example provider network (or "service provider system") environment according to some embodiments. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some embodiments, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
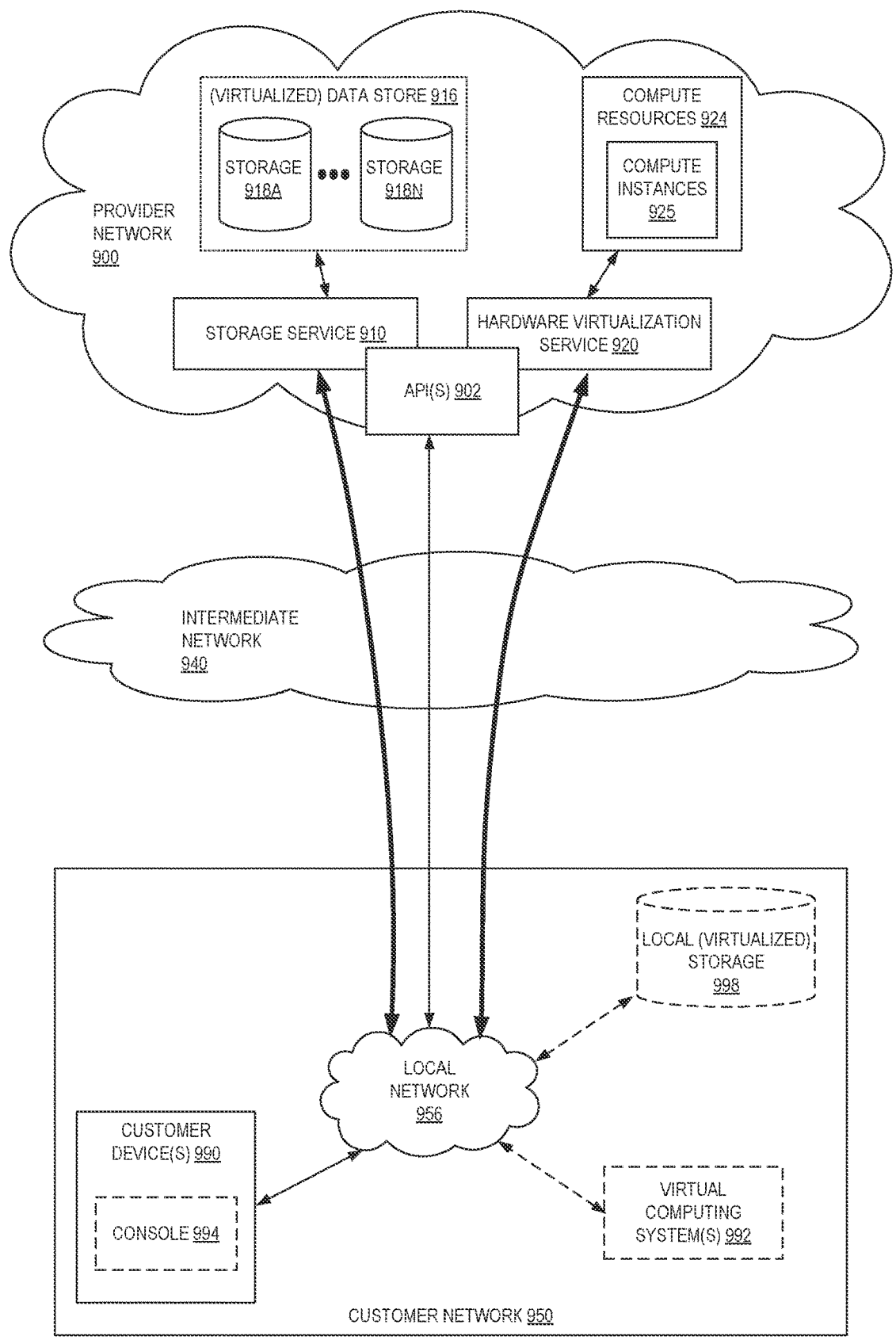
FIG. 9 is a block diagram of an example provider network that provides a storage service and a hardware virtualization service to customers according to some embodiments.

FIG. 9 is a block diagram of an example provider network environment that provides a storage service and a hardware virtualization service to customers, according to some embodiments. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some embodiments, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some embodiments, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some embodiments, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some embodiments, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
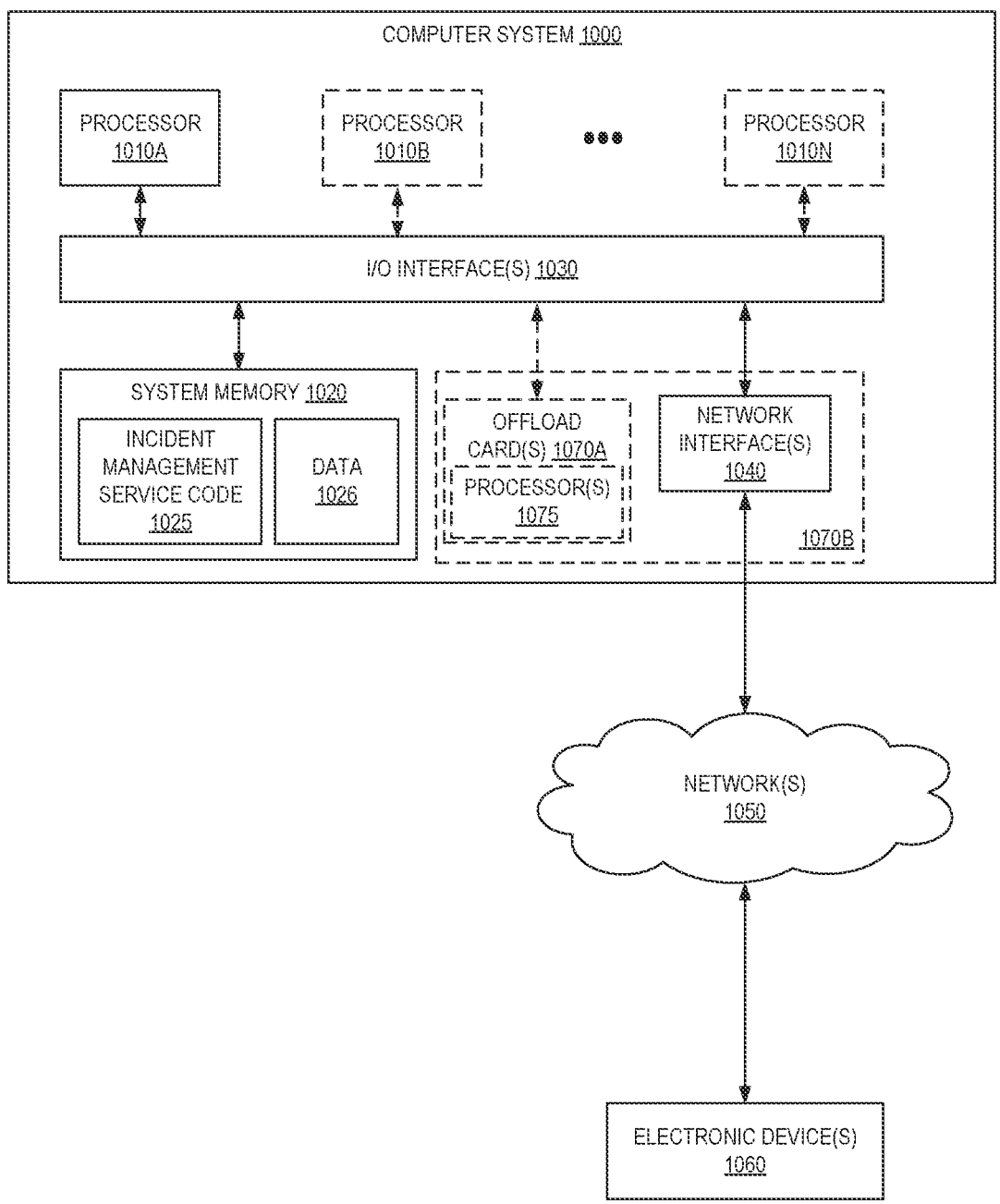
FIG. 10 is a block diagram illustrating an example computer system that can be used in some embodiments.

In some embodiments, a system that implements a portion or all of the techniques described herein can include a general-purpose computer system, such as the computer system 1000 illustrated in FIG. 10, that includes, or is configured to access, one or more computer-accessible media. In the illustrated embodiment, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various embodiments the computer system 1000 can include one computing device or any number of computing devices configured to work together as a single computer system 1000.

In various embodiments, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various embodiments, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various embodiments, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1020 as incident management service code 1025 (e.g., executable to implement, in whole or in part, the incident management service 102) and data 1026.

In some embodiments, the I/O interface 1030 can be configured to coordinate I/O traffic between the processor 1010, the system memory 1020, and any peripheral devices in the device, including the network interface 1040 and/or other peripheral interfaces (not shown). In some embodiments, the I/O interface 1030 can perform any necessary protocol, timing, or other data transformations to convert data signals from one component (e.g., the system memory 1020) into a format suitable for use by another component (e.g., the processor 1010). In some embodiments, the I/O interface 1030 can include support for devices attached through various types of peripheral buses, such as a variant of the Peripheral Component Interconnect (PCI) bus standard or the Universal Serial Bus (USB) standard, for example. In some embodiments, the function of the I/O interface 1030 can be split into two or more separate components, such as a north bridge and a south bridge, for example. Also, in some embodiments, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various embodiments, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations, such as pausing and/or un-pausing compute instances, launching and/or terminating compute instances, performing memory transfer/copying operations, etc. These management operations can, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and can not coordinate with (or service) any separate hypervisor.

In some embodiments, the system memory 1020 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   training an incident machine learning model to predict incident causes and to yield a trained incident machine learning model, the training based on a labeled training data set, the labeled training data set generated based on a set of past incident data and a set of past state data, the set of past incident data and the set of past state data pertaining to a set of past incidents in a provider network, a past incident of the set of past incidents affecting a service or component in the provider network, a past incident of the set of past incidents labeled in the labeled trained data set with at least one label representing a cause of the past incident, and, for an incident of the set of past incidents, past state data pertaining to the past incident indicates one or more changes to the service or component affected by the past incident made prior to the past incident;
   receiving a request from a monitoring service of the provider network to identify a cause of an incident affecting performance of one or more services or components of the provider network, the request including performance metric data associated with the one or more services or components of the provider network;
   obtaining state data from an incident data repository, the state data indicating a set of one or more changes to the one or more services or components of the provider network over a previous time period prior to the incident;
   providing the performance metric data and the state data to the trained incident machine learning model;
   receiving inference results from the trained incident machine learning model indicating at least one cause of the incident and at least one team to investigate the incident; and
   automatically executing one or more mitigation actions to mitigate the incident based at least on the inference results.

2. The computer-implemented method of claim 1, wherein automatically executing one or more mitigation actions to mitigate the incident based at least on the inference results, further comprises:
   based on a confidence value associated with the at least one team to investigate the incident, automatically engaging the at least one team to investigate the incident.

3. The computer-implemented method of claim 1, wherein automatically executing one or more mitigation actions to mitigate the incident based at least on the inference results, further comprises:
   based on a confidence value associated with the at least one cause of the incident, automatically sending a request to a service update manager to roll back the set of one or more changes to the one or more services or components of the provider network over the previous time period prior to the incident.

4. A computer-implemented method comprising:
   training an incident machine learning model to predict incident causes and to yield a trained incident machine learning model, the training based on a labeled training data set, the labeled training data set generated based on a set of past incident data and a set of past state data, the set of past incident data and the set of past state data pertaining to a set of past incidents in a provider network, a past incident of the set of past incidents affecting a service or component in the provider network, a past incident of the set of past incidents labeled in the labeled trained data set with at least one label representing a cause of the past incident, and, for an incident of the set of past incidents, past state data pertaining to the past incident indicates one or more changes to the service or component affected by the past incident made prior to the past incident;
   receiving a set of incident data associated with an incident impacting a service or component of the provider network;
   obtaining a set of state data, the set of state data comprising state change information indicating a set of changes to the service or component over a previous time period prior to the incident;
   using the trained incident machine learning model to predict a cause of the incident based at least on the set of incident data and the set of state data;
   identifying one or more mitigation actions for mitigating the incident; and
   automatically executing the one or more mitigation actions to mitigate the incident.

5. The computer-implemented method of claim 4, wherein the incident comprises a change in service quality of the service or component based on one or more performance metrics.

6. The computer-implemented method of claim 4, wherein the identifying the one or more mitigation actions for mitigating the incident is based on using at least one machine learning model based on the set of incident data; and wherein the one or more mitigation actions include at least one of engagement of a team indicated by the at least one machine learning model to be associated with the cause of the incident or roll back of a state change indicated by the at least one machine learning model to be associated with the cause of the incident.

7. The computer-implemented method of claim 4, further comprising:
   maintaining an incident data repository comprising the set of past incident data pertaining to the set of past incidents, wherein the set of past incident data is received from a plurality of monitoring services and includes the set of past state data and includes performance metric data associated with each past incident of the set of past incidents.

8. The computer-implemented method of claim 7, wherein identifying the one or more mitigation actions for mitigating the incident is based on using at least one machine learning model based on the set of incident data; and wherein the method further comprises:
providing the set of past incident data to a model training system of a machine learning service of a provider network, wherein the model training system is configured to train the at least one machine learning model using the set of past incident data.

9. The computer-implemented method of claim 8, wherein at least a portion of the set of past incident data is auto-labeled to indicate a cause of a corresponding past incident and details of a resolution of the corresponding past incident.

10. The computer-implemented method of claim 9, further comprising:
receiving a set of resolution data associated with the incident after the incident has been mitigated, the set of resolution data indicating a team responsible for investigating the incident, the cause of the incident, and an action taken to mitigate the incident; and
updating the incident data repository to include the set of resolution data associated with the incident.

11. The computer-implemented method of claim 10, wherein identifying the one or more mitigation actions for mitigating the incident is based on using at least one machine learning model based on the set of incident data; and wherein the method further comprises:
providing a set of updated past incident data including the set of resolution data associated with the incident to the model training system; and
causing the model training system to retrain the at least one machine learning model using the set of updated past incident data.

12. The computer-implemented method of claim 4, wherein identifying the one or more mitigation actions for mitigating the incident is based on using at least one machine learning model based on the set of incident data; and wherein the at least one machine learning model comprises an ensemble of machine learning models including a first machine learning model to identify a team associated with the incident, a second machine learning model to identify a provider network component associated with the incident, and a third machine learning model to identify one or more state changes associated with the incident.

13. The computer-implemented method of claim 4, further comprising:
providing an incident management user interface which includes a visual representation of the incident and the one or more mitigation actions; and
receiving instructions to perform at least one mitigation action via the incident management user interface.

14. The computer-implemented method of claim 13, further comprising:
receiving a request to mark at least one component as relevant or not relevant to the incident via the incident management user interface.

15. The computer-implemented method of claim 4, wherein the incident is associated with the service or component of a provider network.

16. The computer-implemented method of claim 4, wherein the incident is associated with the service or component of a customer application running in a provider network.

17. A system comprising:
a first one or more electronic devices to implement a machine learning service in a multi-tenant provider network, the machine learning service including instructions that upon execution cause the machine learning service to:
train, based on a labeled training data set, an incident machine learning model to predict incident causes and to yield a trained incident machine learning model;
wherein the labeled training data set is generated based on a set of past incident data and a set of past state data;
wherein the set of past incident data and the set of past state data pertain to a set of past incidents in the multi-tenant provider network;
wherein a past incident of the set of past incidents affects a service or component in the multi-tenant provider network;
wherein a past incident of the set of past incidents is labeled in the labeled trained data set with at least one label representing a cause of the past incident;
wherein, for an incident of the set of past incidents, past state data pertaining to the past incident indicates one or more changes to the service or component affected by the past incident made prior to the past incident; and
a second one or more electronic devices to implement an incident management service in the multi-tenant provider network, the incident management service including instructions that upon execution cause the incident management service to:
receive a set of incident data associated with an incident impacting a service or component of the multi-tenant provider network;
obtain a set of state data, the set of state data comprising state change information indicating a set of changes to the service or component over a previous time period prior to the incident;
use a machine learning model to predict a cause of the incident based at least on the set of incident data and the set of state data;
identify one or more mitigation actions for mitigating the incident; and
automatically execute the one or more mitigation actions to mitigate the incident.

18. The system of claim 17, wherein the incident comprises a decrease in performance of a service or component of the multi-tenant provider network below a threshold metric value.

19. The system of claim 17, wherein the one or more mitigation actions include at least one of engagement of a team or roll back of a code change.

20. The system of claim 17, wherein the instructions, when executed, further cause the incident management service to:
maintain an incident data repository comprising the set of past incident data pertaining to the set of past incidents, wherein the set of past incident data is received from a plurality of monitoring services of the multi-tenant provider network and includes the set of past state data and performance metric data associated with each past incident in the set of past incidents.

* * * * *